(12) United States Patent
Ramian et al.

(10) Patent No.: US 11,451,314 B2
(45) Date of Patent: Sep. 20, 2022

(54) MEASUREMENT METHOD AND MEASUREMENT SYSTEM

(71) Applicant: Rohde & Schwarz GmbH & Co. KG, Munich (DE)

(72) Inventors: Florian Ramian, Munich (DE); Florian Gerbl, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 250 days.

(21) Appl. No.: 16/938,616

(22) Filed: Jul. 24, 2020

(65) Prior Publication Data

US 2022/0029718 A1 Jan. 27, 2022

(51) Int. Cl.
*H04B 17/391* (2015.01)

(52) U.S. Cl.
CPC .................................. *H04B 17/391* (2015.01)

(58) Field of Classification Search
CPC ................................................... H04B 17/391
See application file for complete search history.

(56) References Cited

U.S. PATENT DOCUMENTS

| 10,382,076 B2 | 8/2019 | Noda |
| 2002/0013672 A1 | 1/2002 | Higashide |
| 2012/0146840 A1 | 6/2012 | Ookawa |
| 2017/0336454 A1 | 11/2017 | Hinotani et al. |
| 2019/0115941 A1 | 4/2019 | Noda |
| 2019/0334635 A1 | 10/2019 | Kawamura et al. |

FOREIGN PATENT DOCUMENTS

| CN | 105652173 A | 6/2016 |
| EP | 2040333 A1 | 3/2009 |

*Primary Examiner* — Natasha W Cosme

(74) *Attorney, Agent, or Firm* — Christensen O'Connor Johnson Kindness PLLC

(57) ABSTRACT

A measurement method includes providing a test signal to a first signal path and to a second signal path within a predefined time interval, thereby obtaining a first signal and a second signal, respectively; consecutively modifying at least one of a phase and an amplitude of the first signal and of the second signal, thereby obtaining a first modified signal and a second modified signal, respectively; applying a first window at least to the first signal, thereby obtaining a first set of measurement data being associated with at least the first signal; applying a second window at least to the second signal, thereby obtaining a second set of measurement data being associated with at least the second signal; and determining a response function difference between the signal paths based on the first set of measurement data and the second set of measurement data. Further, a measurement system is described.

21 Claims, 4 Drawing Sheets

MEASUREMENT METHOD AND MEASUREMENT SYSTEM

FIELD OF THE DISCLOSURE

Embodiments of the present disclosure generally relate to a measurement method for determining a response function difference between at least two different signal paths. Embodiments of the present disclosure further relate to a measurement system.

BACKGROUND

Many electronic devices communicate via several signal paths simultaneously, for example in order to enhance the bandwidth with which the electronic device can communicate.

The signals propagating through the individual signal paths may have to be recombined at receiver side in order to fully restore the information comprised in the transmission. Thus, it is important to know differences in the transmission properties of the individual signal paths, as these differences may have an impact on an error rate of the transferred information.

Moreover, for certain measurement systems, such as phased arrays, differences in the transmission properties of the signal paths via the individual antennas of the phased array need to be known, e.g., in order to correctly configure the phased array for transmission or radio reception.

Usually, a reference signal or a clock signal is necessary in order to determine the transmission property differences between the individual signal paths. However, many electronic devices are not configured to provide a reference signal or a clock signal.

Thus, there is a need for a measurement method and a measurement system that allow determining transmission property differences between different signal paths without reference signal.

SUMMARY

Embodiments of the present disclosure provide a measurement method for determining a response function difference between at least two different signal paths. The measurement method comprises the following steps:

providing a test signal to a first signal path and to a second signal path within a predefined time interval, thereby obtaining a first signal and a second signal, respectively;

consecutively modifying at least one of a phase and an amplitude of the first signal and of the second signal, thereby obtaining a first modified signal and a second modified signal, respectively;

applying a first window at least to the first signal, thereby obtaining a first set of measurement data being associated with at least the first signal;

applying a second window at least to the second signal, thereby obtaining a second set of measurement data being associated with at least the second signal; and determining a response function difference between the signal paths based on the first set of measurement data and the second set of measurement data.

Therein an in the following, the term "signal path" is understood to denote a physical signal path through which the respective signal propagates, wherein the respective physical signal path may either be wire-based one or a wireless one, i.e. an over-the-air (OTA) signal path.

In some embodiments, the first signal path and the second signal path are two physically different signal paths that extend from a signal generating device generating the test signal to a signal receiving device receiving either the test signal or the first signal, the second signal, the first modified signal, and the second modified signal.

For example, the first signal path may be established between the signal generating device and a first antenna of the signal receiving device, while the second signal path may be established between the signal generating device and a second antenna of the signal receiving device. The signal generating device may have at least one antenna. However, the signal generating device can also comprise several antennas. In any case, different signal paths are established between the signal generating device and the signal receiving device.

The measurement method according to the present disclosure is based on the idea to provide the same test signal to the first signal path and to the second signal path simultaneously or sequentially within the predefined time interval, and to consecutively modify the signal propagating in one of the signal paths at a time.

In some embodiments, the first signal and the second signal may be attenuated and/or time-shifted (via phase-shifting) in order to generate the first modified signal and the second modified signal, respectively.

While the signal is modified in the second signal path, the first window may be active and the corresponding first set of measurement data is obtained. While the signal is modified in the first signal path, the second window may be active and the corresponding second set of measurement data is obtained.

By comparing the first set of measurement data with the second set of measurement data, the response function difference between the first signal path and the second signal path, namely the respective signals processed by the paths, can be determined without any reference signal or clock signal being transmitted together with the test signal.

Therein, the response function difference corresponds to the difference of the individual response functions that are associated with the first signal path and the second signal path, respectively.

The response function difference may also be called differential since it is the difference between two absolute measurements.

In some embodiments, the test signal is established as a periodic signal having a predefined signal period.

The individual response functions that are associated with the first signal path and the second signal path may not be determined individually. Instead, the response function difference between the first signal path and the second signal path may be determined directly based on the first set of measurement data and based on the second set of measurement data.

According to an embodiment of the present disclosure, the test signal is provided to the first path and to the second path simultaneously or sequentially. If the test signal is provided to the first path and to the second path sequentially, then it may be provided within the predetermined time interval. This way, it is ensured that the environmental conditions for the test signal propagating through the first signal path and the second signal path are similar or even essentially identical, resulting in better comparison of the sets of measurement data obtained.

According to an aspect of the present disclosure, the first modified signal and the second modified signal are attenuated completely. In other words, the first modified signal corresponds to the first signal being blocked completely, while the second modified signal corresponds to the second signal being blocked completely. Accordingly, the first set of measurement data only comprises data being associated with the first signal since the second signal has been blocked when being modified, while the second set of measurement data only comprises data being associated with the second signal since the first signal has been blocked when being modified.

Thus, the first set of measurement data comprises information on the transmission properties of the first signal path only. Likewise, the second set of measurement data comprises information on the transmission properties of the second signal path only.

According to another aspect of the present disclosure, the first window is applied to a superposition of the first signal and the second modified signal. Accordingly, the second modified signal may not be attenuated completely, but only partially. Thus, the first set of measurement data may comprise information on the transmission properties of both of the first signal path and the second signal path. However, as the first signal and the second signal are present with different respective weights in the first window and in the second window due to the different attenuation, the response function difference between the first signal path and the second signal path can be determined nevertheless.

In a further embodiment of the present disclosure, the second window is applied to a superposition of the second signal and the first modified signal. Thus, the second set of measurement data comprises information on the transmission properties of both of the first signal path and the second signal path. However, as the first signal and the second signal are present with different weights in the first window and in the second window due to the different attenuations, the response function difference between the first signal path and the second signal path can be determined nevertheless.

According to another aspect of the present disclosure, the predefined time interval is much smaller than an expected group delay between the first signal path and the second signal path. In other words, the predefined time interval is much smaller than a differential group delay being associated with the first signal path and the second signal path.

The predefined time interval may be smaller than 50% of the expected group delay, for example, smaller than 25% of the expected group delay, for example smaller than 10% of the expected group delay. This way, it is ensured that the environmental conditions for the test signal propagating through the first signal path and the second signal path are essentially identical.

According to a further embodiment of the present disclosure, the first set of measurement data and the second set of measurement data are transformed to frequency domain, thereby obtaining a first set of transformed measurement data and a second set of transformed measurement data. Therein, the first set of measurement data and the second set of measurement data are transformed to frequency domain individually, i.e. independently from one another.

Accordingly, the first set of measurement data comprises information on the frequency content and the respective phases of at least the first signal, for example, information on the frequency content and the respective phases of the superposition of the first signal and the second modified signal.

Likewise, the second set of measurement data comprises information on the frequency content and the respective phases of at least the second signal, for example, information on the frequency content and the respective phases of the superposition of the second signal and the first modified signal.

In a further embodiment of the present disclosure, the first set of transformed measurement data and the second set of transformed measurement data are compared in order to determine the response function difference. In some embodiments, the response function difference between the first signal path and the second signal path may be determined based on phase differences and/or amplitude differences between the first set of transformed measurement data and the second set of transformed measurement data.

In some embodiments, at least one of the first window and the second window is established as a time domain window function. In some embodiments, both the first window and the second window are established as a time domain window function. In other words, a certain portion of the first signal or of the superposition of the first signal and the second modified signal is selected for further analysis via the first window in time domain. Similarly, a certain portion of the second signal or of the superposition of the second signal and the first modified signal is selected for further analysis via the second window in time domain.

According to an aspect of the present disclosure, the first window has a width being an integer multiple of a period of the test signal. This choice is particularly suitable for transforming the first set of measurement data to frequency domain, because errors may occur if the integration or summation boundaries of the corresponding Fourier transformation or Fourier series do not match the signal period or integer multiples thereof.

Similarly, the second window may have a width being an integer multiple of the period of the test signal. This choice is particularly suitable for transforming the second set of measurement data to frequency domain, because errors may occur if the integration or summation boundaries of the corresponding Fourier transformation or Fourier series do not match the signal period or integer multiples thereof.

In some embodiments, the response function difference is established as at least one of a phase response difference, an amplitude response difference, a frequency response difference, an impulse response difference, and a step response difference. As already mentioned above, the phase response difference corresponds to a difference between the phase responses of the first signal path and the second signal path. The amplitude response difference corresponds to a difference between the amplitude responses of the first signal path and the second signal path, etc.

In a further embodiment of the present disclosure, a correction factor is applied to the phase response difference if the first window and the second window are spaced apart by a non-integer multiple of a period of the test signal. This way, the phase response difference is corrected for phase differences that occur due to phase differences of the test signal and not due to phase response differences of the first signal path and the second signal path.

According to an aspect of the present disclosure, a group delay between the signal paths is determined based on the response function difference. In some embodiments, the group delay between the signal paths is determined based on the phase response difference between the first signal path and the second signal path.

The test signal may be established as a multi-carrier continuous wave signal or as a modulated signal. For example, the test signal may be generated based on a mobile communication standard, such as 3G, 4G, 5G, or 5G-NR.

In some embodiments, characteristic signal properties of the test signal may be known and may be used in order to estimate a frequency offset between the signal generating device and the signal receiving device.

A response function difference between the second signal path and a third signal path may be determined. For example, the response function difference between the second signal path and the third signal path may be determined analogously to the measurement method described above.

In a further embodiment of the present disclosure, a response function difference between the first signal path and the third signal path is determined based on the determined response function difference between the first signal path and the second signal path, and based on the determined response function difference between the second signal path and the third signal path. More precisely, the response function difference between the first signal path and the third signal path may be determined by adding the response function difference between the first signal path and the second signal path, and the response function difference between the second signal path and the third signal path, and dividing the result by two.

The response function difference between the second signal path and a third signal path may be extrapolated based on the determined response function difference between the first signal path and the second signal path. In other words, the response function difference between the second signal path and the third signal path may be calculated based on the already determined response function difference between the first signal path and the second signal path rather than being determined based on another measurement.

Embodiments of the present disclosure further provide a measurement system. The measurement system comprises a signal generating device, a signal receiving device, at least a first signal path and a second signal path, a modification circuit or module, and a signal analysis circuit or module. The signal generating device and the signal receiving device are connected via both of the first signal path and the second signal path in a signal transmitting manner. The signal generating device is configured to provide a test signal to the first signal path and to the second signal path within a predefined time interval, thereby obtaining a first signal and a second signal, respectively. The modification module is configured to consecutively modify at least one of a phase and an amplitude of the first signal and of the second signal, thereby obtaining a first modified signal and a second modified signal, respectively. The signal receiving device comprises the modification module or is configured to receive the first signal, the first modified signal, the second signal, and the second modified signal. The signal analysis module is configured to apply a first window at least to the first signal, thereby obtaining a first set of measurement data being associated with at least the first signal. The signal analysis module further is configured to apply a second window at least to the second signal, thereby obtaining a second set of measurement data being associated with at least the second signal. The signal analysis module is configured to determine a response function difference between the signal paths based on the first set of measurement data and the second set of measurement data.

In some embodiments, the measurement system is configured to perform the measurement method described above.

Therein and in the following, the term "connected in a signal transmitting manner" is understood to denote a cable-based or wireless connection that is configured to transmit signals between the respective devices or components.

Regarding the advantages and further characteristics of the measurement system, reference is made to the explanations given above with respect to the measurement method, which also hold for the measurement system and vice versa.

The signal generating device may comprise a local oscillator being configured to generate an internal reference signal, and the signal generating device may be configured to generate the test signal based on the internal reference signal.

The signal analysis module may comprise another local oscillator being configured to generate an internal reference signal, and the signal analysis module may be configured to process the first signal, the second signal, the first modified signal and/or the second modified signal based on the internal reference signal.

The modification module may comprise a first modification circuit or unit being associated with the first signal path, and a second modification circuit or unit being associated with the second signal path.

Accordingly, the first modification unit may be configured to modify the first signal, thereby generating the first modified signal.

Likewise, the second modification unit may be configured to modify the second signal, thereby generating the second modified signal.

According to an aspect of the present disclosure, one of the signal generating device and the signal receiving device is established as a device under test. In other words, a device under test being tested via the measurement system may be established either as the signal generating device or as the signal receiving device of the measurement system.

According to another aspect of the present disclosure, the signal analysis module is configured to transform the first set of measurement data and the second set of measurement data to frequency domain, thereby obtaining a first set of transformed measurement data and a second set of transformed measurement data. Therein, the signal analysis module may be configured to transform the first set of measurement data and the second set of measurement data to frequency domain individually, i.e. independent from one another.

Accordingly, the first set of measurement data comprises information on the frequency content and the respective phases of at least the first signal, for example, information on the frequency content and the respective phases of the superposition of the first signal and the second modified signal.

Likewise, the second set of measurement data comprises information on the frequency content and the respective phases of at least the second signal, for example, information on the frequency content and the respective phases of the superposition of the second signal and the first modified signal.

In a further embodiment of the present disclosure, the signal analysis module is configured to compare the first set of transformed measurement data and the second set of transformed measurement data in order to determine the response function difference. In some embodiments, the signal analysis module is configured to determine the response function difference between the first signal path and the second signal path based on phase differences and/or amplitude differences between the first set of transformed measurement data and the second set of transformed measurement data.

Generally, the measurement system and the measurement method can be used in radio frequency (RF)-to-digital (and digital-to-RF) measurements, such as e.g. phased arrays. In some embodiments, differential group delay measurements between two or more signal paths are essential in RF-To-Digital (and Digital-To-RF) measurements.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
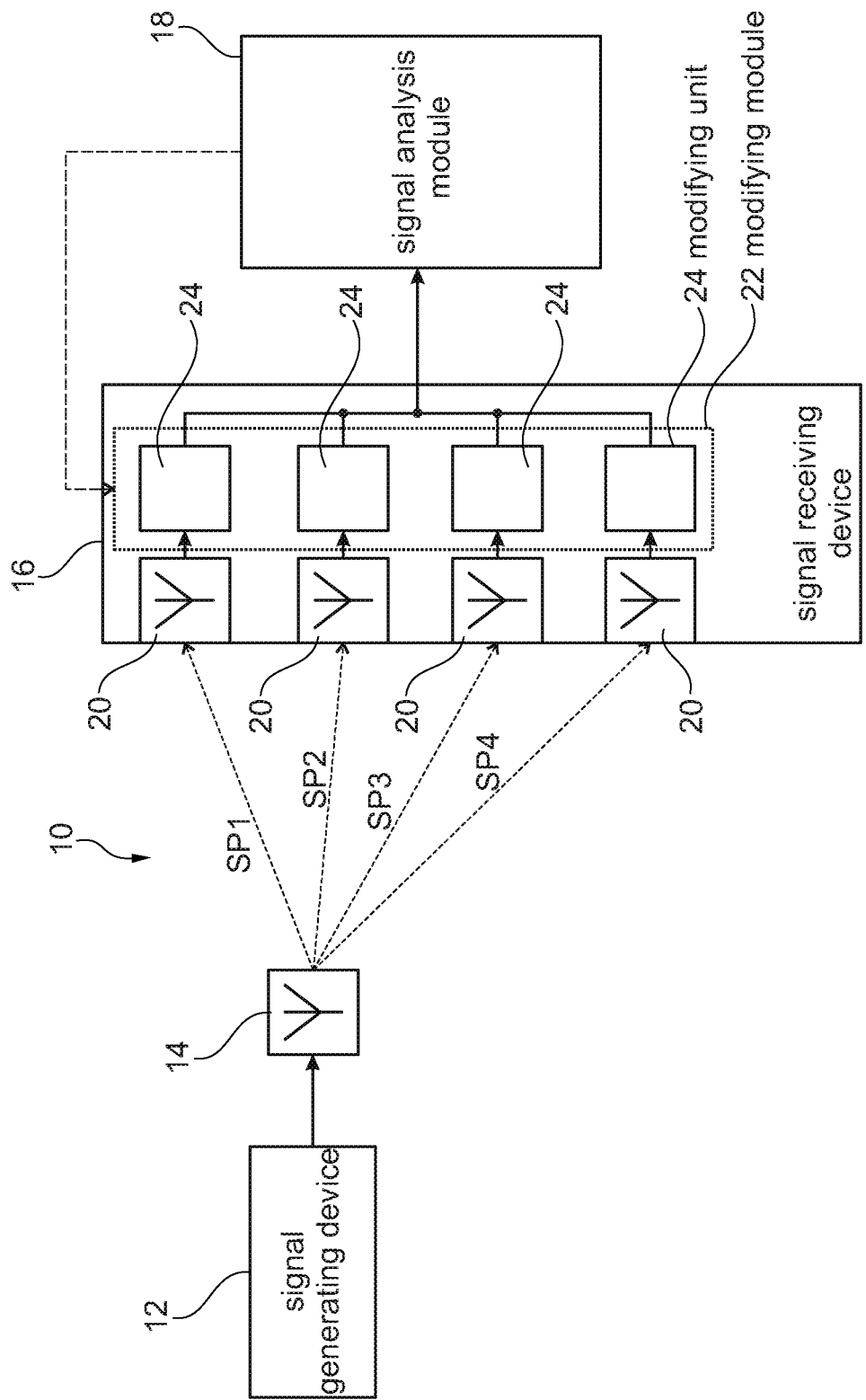
FIG. 1 schematically shows a block diagram of a measurement system according to the present disclosure.

FIG. 1 schematically shows a measurement system 10 comprising a signal generating device 12 connected to an antenna 14, a signal receiving device 16, and a signal analysis circuit or module 18.

Therein and in the following, the term "module" is understood to describe suitable hardware, suitable software, or a combination of hardware and software that is configured to have a certain functionality.

In general, the signal generating device 12 is configured to generate a test signal having a predefined frequency or a predefined frequency range. For example, the signal generator device 12 may be established as a (vector) signal generator.

The test signal may be established as a multi-carrier continuous wave signal or as a modulated signal. For example, the test signal may be generated by means of the signal generating device 12 based on a mobile communication standard, such as 3G, 4G, 5G, or 5G-NR.

The signal generator device 12 is connected to the antenna 14, which is configured to transmit the test signal generated by the signal generating device 12. For example, the antenna 14 may be established as a horn antenna.

Of course, the antenna 14 may also be integrated into the signal generator device 12.

Likewise, the signal generator device 12 may comprise several antennas 14 or the signal generator device 12 may be connected to several antennas 14.

In the exemplary embodiment shown in FIG. 1, the signal receiving device 16 comprises several antennas 20 and a modifying circuit or module 22.

The signal receiving device 16 may be established as a phased antenna array, for example, as an active phased antenna array.

The antennas 20 of the signal receiving device 16 may be arranged in a one-dimensional pattern, in a two-dimensional pattern, or in a three-dimensional pattern.

The modifying module 22 comprises several modifying circuits or units 24, wherein each modifying unit 24 is connected to one of the antennas 20 of the signal receiving device 16.

Each of the modifying units 24 is configured to modify an amplitude and/or a phase of a signal received from the respectively associated antenna 20.

The signal analysis module 18 is connected to the signal receiving device 16 in a signal transmitting manner. More precisely, the signal analysis module 18 is connected to each of the several modifying units 24 in a signal transmitting manner In general, the signal analysis module 18 is configured to analyze signals received via each of the antennas 20, wherein the respective signals may be modified by the individual modifying units 24 of the modifying module 22.

For example, the signal analysis module 18 is established as at least one of an oscilloscope, a vector network analyzer, a (vector) signal analyzer, and a computer with a suitable measurement application.

As is indicated by the dashed arrows in FIG. 1, there are several different signal paths between the signal generator device 12 and the signal receiving device 16, which are labelled with SP1 to SP4.

For example, a first signal path SP1 extends between the antenna 14 that is associated with the signal generating device 12 and the upper antenna 20 of the signal receiving device 16.

A second signal path SP2 extends between the antenna 14 and another antenna 20 of the signal receiving device 16, etc.

In general, for communication systems such as the one shown in FIG. 1 having several different signal paths, it is important to know differences in the transmission properties between the individual signal paths SP1 to SP4.

Generally speaking, the measurement system 10 is configured to determine a response function difference between at least two of the different signal paths SP1 to SP4. For this purpose, absolute measurements of the signals paths SP1 to SP4 have been performed previously in order to derive at a differential accordingly.

Therein, one of the signal generating device 12 and the signal receiving device 16 may be a device under test that is tested via the measurement system 10.

For example, the signal receiving device 16 being established as a phased array may be established as the device under test, wherein the signal generator device 12 generates the corresponding test signal, and the response of the signal receiving device 16 to the test signal is analyzed via the signal analysis module 18.

Figure 2:
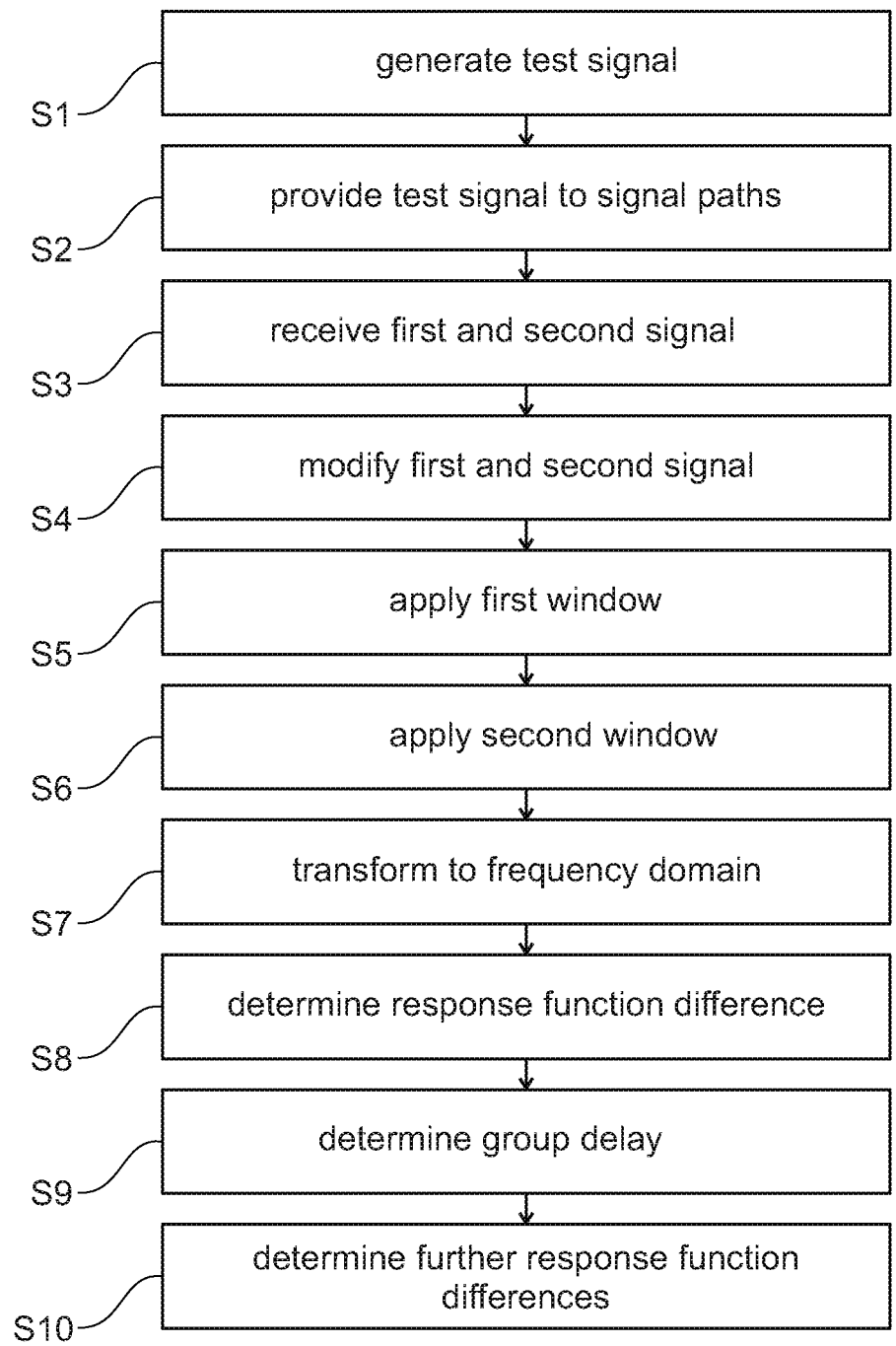
FIG. 2 shows a flow chart of a measurement method according to the present disclosure.

More precisely, the measurement system 10 is configured to perform a measurement method for determining a response function difference between at least two of the different signal paths, which is described in the following with reference to FIG. 2.

The test signal described above is generated by means of the signal generating device 12 and transmitted via the antenna 14 (step S1).

Therein, the test signal is established as a periodic signal having a predefined signal period.

The test signal is provided at least to the first signal path SP1 and to the second signal path SP2 within a predetermined time interval, thereby obtaining a first signal and a second signal, respectively (step S2).

Therein, the predetermined time interval is much smaller than an expected group delay between the first signal path SP1 and the second signal path SP2. For example, the predefined time interval may be smaller than 50% of the expected group delay, for example, smaller than 25% of the expected group delay, or smaller than 10% of the expected group delay.

In other words, the test signal is provided at least to the first signal path SP1 and to the second signal path SP2 simultaneously or sequentially, but within a short amount of time (the predefined time interval) if it is provided sequentially.

The first signal and the second signal are received via the antennas 20 that are associated with the first signal path SP1 and the second signal path SP2 (step S3).

The first signal and the second signal are forwarded to the respectively associated modifying units 24 (step S3).

Of course, the first signal and the second signal may be down-converted to an intermediate frequency by corresponding RF frontends of the signal receiving device 16 that are associated with the antennas 20.

The first signal and the second signal are then consecutively modified via the respective modifying units 24, thereby generating a first modified signal and a second modified signal (step S4).

Therein, the modifying units 24 modify at least one of a phase and an amplitude of the first signal and of the second signal, respectively.

For example, the first signal and the second signal may be attenuated completely in order to obtain the first modified signal and the second modified signal.

In other words, the first modified signal and the second modified signal are essentially established as zero-signals, i.e. signals having a constant signal level zero (except for potential perturbations).

Alternatively, the first signal and the second signal may be attenuated by a predetermined amount in order to obtain the first modified signal and the second modified signal, respectively.

For example, the first signal and the second signal may be attenuated by at least 10%, for example, by at least 25%, or by at least 50%, or by at least 90%.

The first signal, the second signal, the first modified signal, and the second modified signal are forwarded to the signal analysis module 18 for further analysis, for example, absolute measurement.

As long as the second signal is attenuated via the corresponding modifying unit 24, the signal analysis module 18 applies a first window to the first signal and to the second modified signal, or more precisely to the superposition of the first signal and the second modified signal, thereby obtaining a first set of measurement data (step S5).

In general, the first window is a time domain window function having a predefined length or rather width. In some embodiments, the predefined length of the first window is an integer multiple of the period of the test signal.

As long as the first signal is attenuated via the corresponding modifying unit 24, the signal analysis module 18 applies a second window to the second signal and the first modified signal, or more precisely to the superposition of the second signal and the first modified signal, thereby obtaining a second set of measurement data (step S6).

In general, the second window is a time domain window function having a predefined length or rather width. In some embodiments, the predefined length of the second window is an integer multiple of the period of the test signal.

Figure 3:
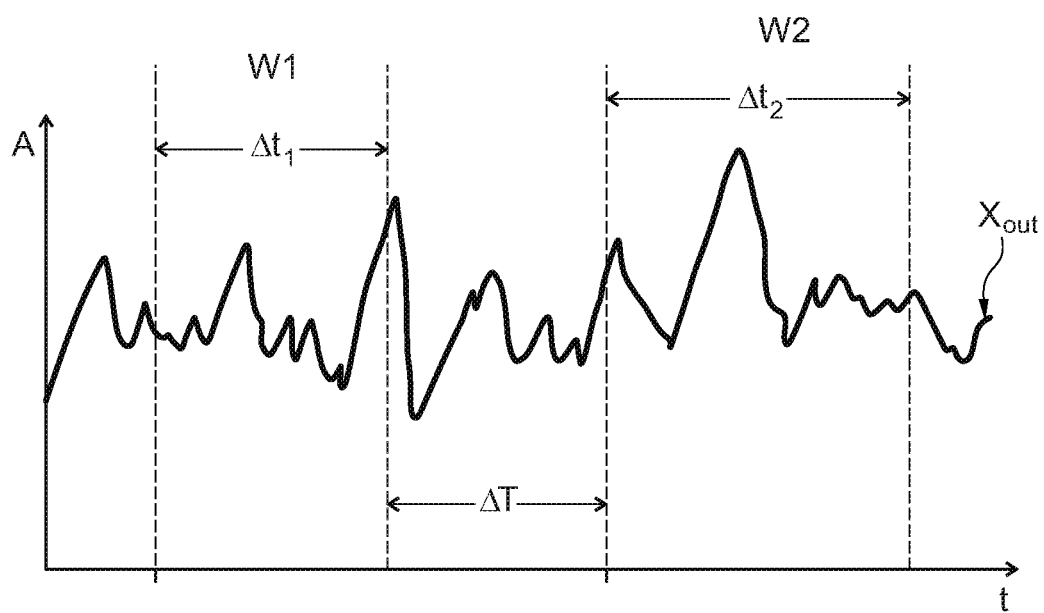
FIG. 3 shows a diagram of a receiver-side signal amplitude plotted against time.

Steps S5 and S6 are illustrated in FIG. 3, which schematically shows a diagram of an amplitude A of an output signal $x_{out}$ of the signal receiving device 16 plotted against time.

Therein, the output signal $x_{out}$ corresponds to the superposition of the first signal with the second modified signal within the first window (denoted by W1 in FIG. 3). Within the second window (denoted by W2), the output signal $x_{out}$ corresponds to the superposition of the second signal with the first modified signal.

The first window W1 has the predefined width $\Delta t_1$, while the second window W2 has the predefined width $\Delta t_2$.

The first window W1 and the second window W2 are spaced apart by a time interval $\Delta T$.

As is indicated by the dashed arrow in FIG. 1, the signal analysis module 18 may control the modifying module 22 or rather the individual modifying units 24 to modify the first signal and the second signal in a predetermined way over a predetermined time span.

The first set of measurement data and the second set of measurement data are respectively transformed to frequency domain, thereby obtaining a first set of transformed measurement data and a second set of transformed measurement data (step S7).

In some embodiments, the first set of measurement data and the second set of measurement data are transformed to frequency domain via a Fourier transform or via a Laplace transform.

A response function difference between the first signal path SP1 and the second signal path SP2 is determined based on the first set of transformed measurement data and the second set of transformed measurement data (step S8). The response function difference may relate to a differential of the absolute measurement data obtained previously.

More precisely, the response function difference is determined based on the comparison of the first set of transformed measurement data with the second set of transformed measurement data.

The response function difference comprises at least one of a phase response difference, an amplitude response difference, a frequency response difference, an impulse response difference, and a step response difference between the first signal path SP1 and the second signal path SP2.

Therein, the phase response difference corresponds to a difference between the phase responses of the first signal path SP1 and of the second signal path SP2. The amplitude response difference corresponds to a difference between the amplitude responses of the first signal path SP1 and of the second signal path SP2, etc.

If the phase response difference is determined, it may be corrected by a suitable phase correction factor if the first window and the second window are spaced apart by a non-integer multiple of the period of the test signal. In other words, the phase response difference may be corrected if $\Delta T$ shown in FIG. 3 is a non-integer multiple of the period of the test signal.

Moreover, a group delay (or rather a differential group delay) between the first signal path SP1 and the second signal path SP2 is determined based on the determined phase response difference (step S9).

Summarizing, the response function difference and/or the (differential) group delay between the first signal path SP1 and the second signal path SP2 is determined in steps S1 to S9 described above.

Further response function differences and/or further (differential) group delays being associated with other pairs of signal paths may be determined (step S10).

In principle, the further response function differences and/or the further (differential) group delays may be determined in a completely similar manner to the steps S1 to S9 described above.

However, these steps do not have to be performed for all pairs of signal paths.

For example, if the response function difference for the first signal path SP1 and the second signal path SP2 as well as the response function difference for the second signal path SP2 and a third signal SP3 path have already been determined, for example according to steps S1 to S9 described above, the response function difference between the first signal path SP1 and the third signal path SP3 can be determined directly, namely due to the previously determined ones.

More precisely, the response function difference between the first signal path SP1 and the third signal path SP3 equals half of the sum of the response function difference between the first signal path SP1 and the second signal path SP2, and the response function difference between the second signal path SP2 and the third signal path SP3.

In other words, if two response function differences $\Delta F_{12}=F_1-F_2$ and $\Delta F_{23}=F_2-F_3$ are known, the response function difference $\Delta F_{13}$ is given by $\Delta F_{13}=-1/2(\Delta F_{12}+\Delta F_{23})$.

Alternatively, the response function difference between the second signal path SP2 and the third signal path SP3 may be extrapolated based on the determined response function difference between the first signal path SP1 and the second signal path SP2.

In other words, the response function difference between the second signal path SP2 and the third signal path SP3 may be calculated based on the already determined response function difference between the first signal path SP1 and the second signal path SP2 rather than being determined based on another measurement (i.e. according to steps S1 to S9).

Summarizing, the measurement system 10 and the measurement method described above allow for differential response function measurements and differential group delay measurements without any reference signal or clock signal being transmitted between the signal generating device 12 and the signal receiving device 16.

Figure 4:
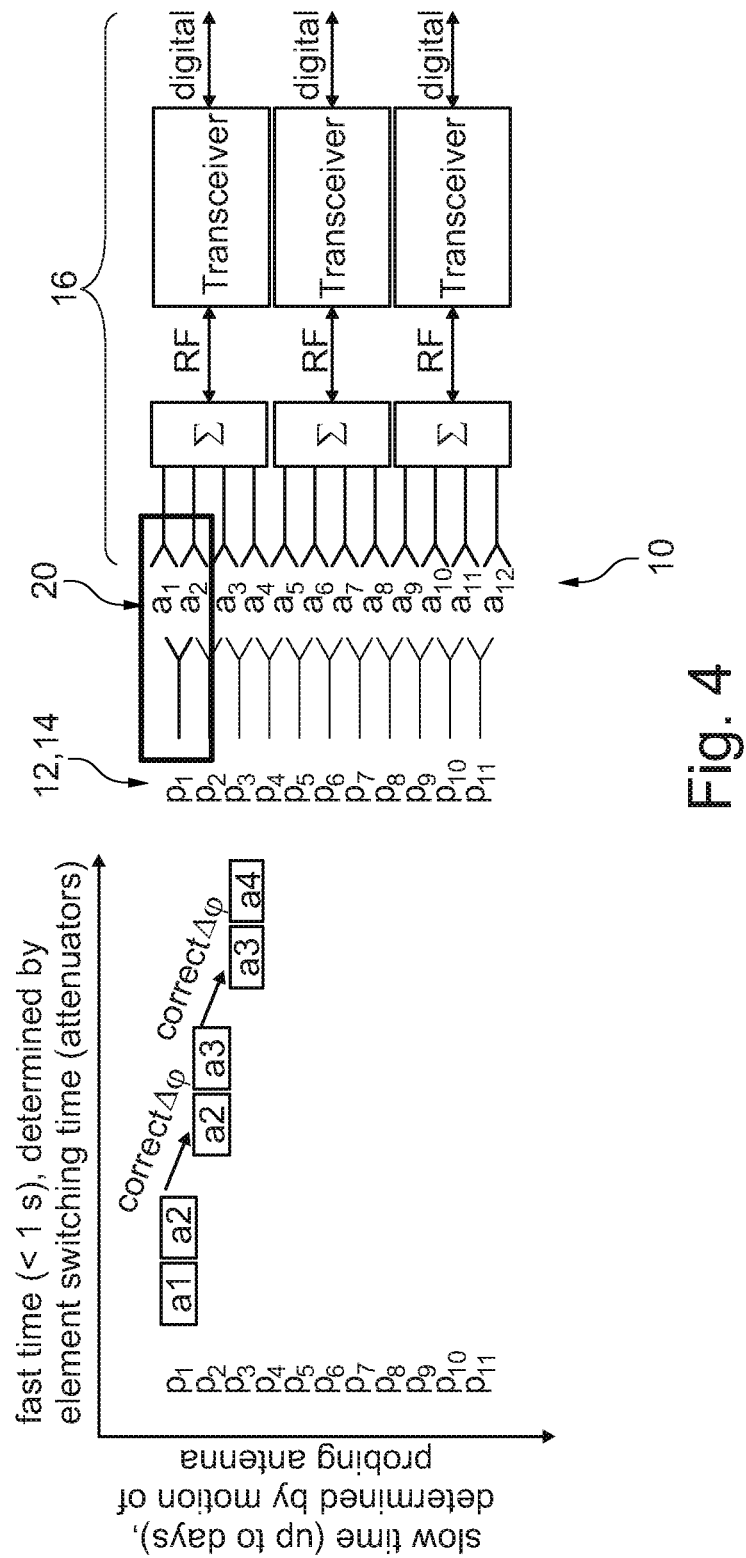
FIG. 4 shows an illustration of individual steps of the measurement method of FIG. 2.

FIG. 4 schematically shows a further embodiment of the measurement system 10. In the following, only the differences to the embodiment shown in FIG. 1 will be explained.

The signal generating device 12 comprises an antenna array with several antennas 14 (labelled with $p_1$ to $p_{11}$).

Similarly to the embodiment of FIG. 1, the signal receiving device comprises an antenna array with several antennas 20.

Accordingly, both the signal generating device 12 and the signal receiving device 16 may be established as a phased antenna array, particularly as a phased antenna array.

The measurement method described above can also be applied to the measurement system 10 of FIG. 4.

However, the total number of different signal paths is considerably higher, as there may be a signal path between each antenna 14 and each antenna 20, i.e. from each $p_i$ to each $a_j$ in FIG. 4.

Generally, the respective response function differences between the several signal paths provided can be determined in a fast manner by changing the antenna 14 and one of the antennas 20 in subsequent measurements as indicated in the diagram of FIG. 4.

As is indicated by the diagram on the left of FIG. 4, the phase response difference between the different signal paths and/or the (differential) group delay may further be corrected for a relative motion between the signal generating device 12 and the signal receiving device 16, if necessary.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A measurement method for determining a response function difference between at least two different signal paths, said measurement method comprising:
   providing a test signal to a first signal path and to a second signal path within a predefined time interval, thereby obtaining a first signal and a second signal, respectively;
   consecutively modifying at least one of a phase and an amplitude of the first signal and of the second signal, thereby obtaining a first modified signal and a second modified signal, respectively;
   applying a first window at least to the first signal, thereby obtaining a first set of measurement data being associated with at least the first signal;
   applying a second window at least to the second signal, thereby obtaining a second set of measurement data being associated with at least the second signal; and
   determining a response function difference between the signal paths based on said first set of measurement data and said second set of measurement data.

2. The measurement method of claim 1, wherein the test signal is provided to the first path and to the second path simultaneously or sequentially.

3. The measurement method of claim 1, wherein the first modified signal and the second modified signal are attenuated completely.

4. The measurement method of claim 1, wherein said first window is applied to a superposition of said first signal and said second modified signal.

5. The measurement method of claim 1, wherein said second window is applied to a superposition of said second signal and said first modified signal.

6. The measurement method of claim 1, wherein said predefined time interval is much smaller than an expected group delay between the first signal path and the second signal path.

7. The measurement method of claim 1, wherein said first set of measurement data and said second set of measurement data are transformed to frequency domain, thereby obtaining a first set of transformed measurement data and a second set of transformed measurement data.

8. The measurement method of claim 7, wherein said first set of transformed measurement data and said second set of transformed measurement data are compared in order to determine the response function difference.

9. The measurement method of claim 1, wherein at least one of said first window and said second window is established as a time domain window function.

10. The measurement method of claim 9, wherein said first window has a width being an integer multiple of a period of the test signal.

11. The measurement method of claim 1, wherein said response function difference is established as at least one of a phase response difference, an amplitude response difference, a frequency response difference, an impulse response difference, and a step response difference.

12. The measurement method of claim 11, wherein a correction factor is applied to said phase response difference if the first window and the second window are spaced apart by a non-integer multiple of a period of the test signal.

13. The measurement method of claim 1, wherein a group delay between the signal paths is determined based on said response function difference.

14. The measurement method of claim 1, wherein said test signal is established as a multi-carrier continuous wave signal or as a modulated signal.

15. The measurement method of claim 1, wherein a response function difference between said second signal path and a third signal path is determined.

16. The measurement method of claim 15, wherein a response function difference between said first signal path and said third signal path is determined based on the determined response function difference between said first signal path and said second signal path, and based on the determined response function difference between said second signal path and said third signal path.

17. The measurement method of claim 15, wherein said response function difference between said second signal path and a third signal path is extrapolated based on the determined response function difference between said first signal path and said second signal path.

18. A measurement system, comprising a signal generating device, a signal receiving device, at least a first signal path and a second signal path, a modification module, and a signal analysis module,
   said signal generating device and said signal receiving device being connected via both of the first signal path and the second signal path in a signal transmitting manner,
   said signal generating device being configured to provide a test signal to the first signal path and to the second signal path within a predefined time interval, thereby obtaining a first signal and a second signal, respectively,
   said modification module being configured to consecutively modify at least one of a phase and an amplitude of the first signal and of the second signal, thereby obtaining a first modified signal and a second modified signal, respectively,
   said signal receiving device comprising said modification module or being configured to receive the first signal, the first modified signal, the second signal, and the second modified signal,
   said signal analysis module being configured to apply a first window at least to the first signal, thereby obtaining a first set of measurement data being associated with at least the first signal,
   said signal analysis module further being configured to apply a second window at least to the second signal, thereby obtaining a second set of measurement data being associated with at least the second signal, and
   said signal analysis module being configured to determine a response function difference between the signal paths based on said first set of measurement data and said second set of measurement data.

19. The measurement system of claim 18, wherein one of the signal generating device and the signal receiving device is established as a device under test.

20. The measurement system of claim 18, wherein said signal analysis module is configured to transform said first set of measurement data and said second set of measurement data to frequency domain, thereby obtaining a first set of transformed measurement data and a second set of transformed measurement data.

21. The measurement system of claim 20, wherein said signal analysis module is configured to compare said first set of transformed measurement data and said second set of transformed measurement data in order to determine the response function difference.

* * * * *